United States Patent Office 3,450,773
Patented June 17, 1969

---

3,450,773
ANESTHETICALLY ACTIVE FLUORINATED METHYL ETHERS
Robert E. A. Dear, Parsippany, and Everett E. Gilbert, Morristown, N.J., assignors to Allied Chemical Corporation, New York, N.Y., a corporation of New York
No Drawing. Filed May 16, 1966, Ser. No. 550,116
Int. Cl. C07c 43/28
U.S. Cl. 260—614                                    7 Claims

ABSTRACT OF THE DISCLOSURE

Methyl ether of fluorinated alkanes useful as inhalation anesthetics and bactericides.

---

This invention relates to new methyl ethers of fluorinated alkanes, alkenes and alkynes and to a process for administering such ethers as inhalation anesthetics.

The novel ethers of our invention have the following general formula $$\begin{array}{c} XF_2C \diagdown \phantom{C} \diagup OCH_3 \\ C \\ YF_2C \diagup \phantom{C} \diagdown R \end{array}$$

wherein X and Y are the same or different and represent hydrogen, fluorine or chlorine; R is a lower (i.e. 1–8 carbon atoms) alkyl, alkenyl, or alkynyl group.

The novel ethers of our invention can be prepared from the corresponding alcohols by reaction with dimethyl sulfate or other methylating agents, e.g. $CH_3Cl$, $CH_3Br$, $CH_3I$, in the presence of aqueous alkali metal hydroxide according to the equation.

$$2 \begin{array}{c} XF_2C \diagdown \phantom{C} \diagup OH \\ C \\ YF_2C \diagup \phantom{C} \diagdown R \end{array} + (CH_3O)_2SO_2 \xrightarrow[H_2O]{NaOH} 2 \begin{array}{c} XF_2C \diagdown \phantom{C} \diagup OCH_3 \\ C \\ YF_2C \diagup \phantom{C} \diagdown R \end{array}$$

wherein X, Y and R are as defined above.

The alcohols from which the ethers of our invention are prepared can themselves be prepared by reaction of a fluoroketone with a Grignard reagent followed by acid hydrolysis according to the reactions shown below.

$$\begin{array}{c} XF_2C \diagdown \\ C=O + RMgBr \longrightarrow \\ YF_2C \diagup \end{array} \begin{array}{c} XF_2C \diagdown \phantom{C} \diagup OMgBr \\ C \\ YF_2C \diagup \phantom{C} \diagdown R \end{array}$$

$$\begin{array}{c} XF_2C \diagdown \phantom{C} \diagup OMgBr \\ C \\ YF_2C \diagup \phantom{C} \diagdown R \end{array} \xrightarrow[\text{Acid}]{H_2O} \begin{array}{c} XF_2C \diagdown \phantom{C} \diagup OH \\ C \\ YF_2C \diagup \phantom{C} \diagdown R \end{array}$$

In preparing the ethers of our invention, the alkyl, alkenyl or alkynyl magnesium halide is prepared in known manner, and the resulting Grignard reagent in a solvent such as tetrahydrofuran (THF) is cooled to, for example, −8° C. and the fluoroacetone is passed in over a 2½ hour period. The mixture is stirred overnight at room temperature, and is then hydrolyzed with aqueous HCl. The excess solvent is distilled from the organic layer leaving a THF:alcohol azeotrope from which the free alcohol is obtained by distillation from concentrated $H_2SO_4$.

The alcohol obtained as above is added to a cooled solution of aqueous alkali metal hydroxide, and to this mixture is slowly added a quantity of dimethyl sulfate at least molecularly equivalent to the alcohol charged. The resulting suspension is warmed to room temperature and agitated for a period of, e.g. about 3 hours and may then be heated to reflux for a short time, e.g. 30 minutes to complete the reaction. The resulting volatile ether is recovered as by distillation from the aqueous mixture. When the ether boils above 100° C., it is recovered by layer separation in a separatory funnel.

The ethers of our invention are useful as general inhalation anesthetics when administered to inhalation-anesthetic-susceptible organisms. Our new compounds are also useful as vapor phase bactericides useful in the control of *Staphylococcus aureus*.

The following specific examples further illustrate our invention.

EXAMPLE 1

Preparation of 1,1,1-trifluoro-2-(trifluoromethyl)-3-butyne-2-ol

Ethynyl magnesium bromide was prepared from ethyl magnesium bromide, in turn prepared from ethyl bromide (60 grams; 0.55 mole) and magnesium (12 grams; 0.5 gram atom) in dry tetrahydrofuran (THF) (300 ml.) according to the instructions of Jones et al. (Org. Synth. 39, 56). The Grignard solution so obtained was cooled to −8° and hexafluoroacetone (66.2 grams, 0.4 mole) was passed in over a 2½ hour period. The mixture was stirred overnight at room temperature and then hydrolyzed with 10% aqueous HCl (200 ml.). The excess solvent was distilled from the organic layer, leaving a THF:alcohol azeotrope, from which the free alcohol was obtained by distillation from concentrated $H_2SO_4$. That the desired compound was obtained was proved by boiling point (77° C.) and infrared and NMR spectra.

EXAMPLE 2

Preparation of 1,1,1-trifluoro-2-(trifluoromethyl)-2-methoxy-3-butyne

A portion of the 1,1,1-trifluoro-2-(trifluoromethyl)-3-butyne-2-ol prepared in Example 1, amounting to 34 grams (0.18 mole), was added, with stirring, to a solution of water (50 ml.) and 14.2 grams of 50% NaOH (7.1 grams NaOH). The mixture was cooled to 3° C., and 22.3 grams (0.18 mole) of dimethyl sulfate was slowly added, with stirring, over a 15 minute period. The resulting cloudy suspension was allowed to warm to room temperature and was stirred for three hours. The reactants were then heated to reflux for 30 minutes to complete the reaction. The resulting volatile 1,1,1-trifluoro-2-trifluoromethyl-2-methoxy-2-butyne was distilled from the aqueous mixture, dried over $CaSO_4$ and redistilled. Its refractive index was $n_D^{25}$ 1.3106; its boiling point was 73° C.

Analysis (percent by weight).—Calc.: C, 34.93; H, 1.96. Found: C, 34.69; H, 1.76.

Its structure, shown below $$\begin{array}{c} F_3C \diagdown \phantom{C} \diagup OCH_3 \\ C \\ F_3C \diagup \phantom{C} \diagdown C\equiv CH \end{array}$$

was verified by infrared spectrum which was similar to that of the starting alcohol except for the absence of the OH stretching band at 3497 cm.$^{-1}$.

EXAMPLE 3

Preparation of 1,1,1-trifluoro-2-(difluorochloromethyl)-2-methoxy-3-butyne

Into a solution of water (50 ml.) and 16 grams of 50% aqueous NaOH solution (0.2 mole) was added, with stirring, 40 grams (0.192 mole) of 1,1,1-trifluoro-2-(difluorochloromethyl)-3-butyne-2-ol. The resulting cloudy suspension was cooled to 0° C., then 25 grams (0.198 mole) of dimethyl sulfate was added slowly, with stirring, during about 10 minutes. The mixture was allowed to warm to room temperature (ca. 25° C.) and was stirred at room temperature for three hours. The mixture was heated to 120° C. and refluxed at this temperature for ½ hour to complete the reaction. The mixture was then layered and the oily layer was separated and dried over $CaSO_4$ and distilled. Its boiling point was 110°–110.5° C., and its refractive index was $n_D^{25}$ 1.3523.

*Analysis* (percent by weight).—Calc.: C, 32.37; H, 1.81. Found: C, 32.64; H, 2.06.

Its structure shown below

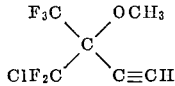

was confirmed by infrared analysis.

EXAMPLE 4

Preparation of 1,1-difluoro-2-(difluoromethyl)-2-methoxy-3-butyne

In the same manner as described in Examples 2 and 3 above, 40 grams (0.256 mole) of 1,1-difluoro-2-(difluoromethyl)-3-butyne-2-ol was reacted in aqueous NaOH solution with 34 grams (0.27 mole) of dimethyl sulfate $(CH_3O)_2SO_2$ and the product recovered by layer separation followed by distillation. The resulting 1,1-difluoro-2-(difluoromethyl)-2-methoxy-3-butyne had a boiling point of 113° C., refractive index $n_D^{25}$ 1.3570.

*Analysis* (percent by weight).—Calc.: C, 42.36; H, 3.56. Found: C, 42.24; H, 3.50.

Its structure, confirmed by infrared spectrogram, is

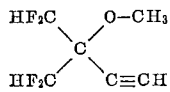

EXAMPLE 5

Preparation of 1,1,1-trifluoro-2-(trifluoromethyl)-2-methoxy-3-butene

In the same manner as described in the foregoing examples, 43 grams (0.221 mole) of 1,1,1-trifluoro-2-(trifluoromethyl)-3-butene-2-ol was reacted in aqueous NaOH solution with 30 grams (0.238 mole) of dimethyl sulfate $(CH_3O)_2SO_2$ and the product recovered by distillation. The resulting 1,1,1-trifluoro-2-(trifluoromethyl)-2-methoxy-3-butene had a boiling point of 78° C., refractive index $n_D^{25}$ 1.3176.

*Analysis* (percent by weight).—Calc.: C, 34.63; H, 2.91. Found: C, 34.42; H, 2.85.

Its structure, confirmed by infrared analysis, is

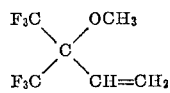

EXAMPLE 6

Preparation of 1,1,1-trifluoro-2-(trifluoromethyl)-2-methoxy-butane

In the same manner as described in the foregoing examples, 40 grams (0.204 mole) of 1,1-bis(trifluoromethyl)-n-propanol was reacted in aqueous NaOH solution with 28.4 grams (0.225 mole) dimethyl sulfate and the product recovered by distillation. The resulting 1,1,1-trifluoro-2-(trifluoromethyl)-2-methoxy-butane at a boiling point of 82.5°–83° C., refractive index $n_D^{25}$ 1.3172.

*Analysis* (weight by percent).—Calc.: C, 34.30; H, 3.84. Found: C, 34.17; H, 3.72.

Its structure, confirmed by infrared analysis, is

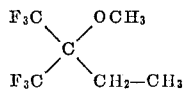

EXAMPLE 7

Preparation of 1,1,1-trifluoromethyl-2-(difluoromethyl)-2-methoxy-3-butyne

In the same manner as described in the foregoing examples, 50 grams (0.287 mole) of 1,1,1-trifluoromethyl-2-(difluoromethyl)-3-butyne-2-ol was reacted in aqueous NaOH solution with 38 grams (0.3 mole) of dimethyl sulfate and the product recovered by distillation. The resulting 1,1,1 - trifluoro - 2 - (difluoromethyl)-2-methoxy-3-butyne had a boiling point of 94° C., refractive index $n_D^{25}$ 1.3327.

*Analysis* (weight by percent).—Calc.: C, 38.31; H, 2.68. Found: C, 38.47; H, 2.79.

Its structure is shown below:

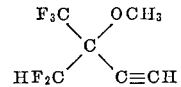

EXAMPLE 8

The ethers of Examples 2–7 were tested as inhalation anesthetics by administering the compounds to mice in a standard test similar to that described by Robbins, J. Pharmacology and Experimental Therapeutics 86, 197–204 (1946).

In the test as carried out, five mice were placed in each of a number of 6.3 liter animal jars wherein the mice were subjected to various dose levels of inhalation anesthetic vapor. Ten mice (five in each of two jars) were used for each dose level. A minimum of three graded doses, injected at 0.1 ml. per 10 seconds was used to establish that dose which caused 50% of the mice to lose the righting reflex in five minutes. The concentration of anesthetic vapor in the jar was calculated using the ideal gas law (see Carson et al., Anesthesiology, 23, 187 (1962)). Results are shown in Table I below. The "$AD_{50}$" (volume percent of compound required to anesthesize 50% of the mice used), was determined by plotting the data on log-probit graph paper (see Miller et al., Proc. Soc. Exp. Biol. and Med., 57, 261 (1944)). Essentially the same experimental procedure was used to determine the "$LD_{50}$" (dosage required to kill 50% of the mice).

The "AI" (anesthetic index=$LD_{50} \div AD_{50}$) is a measure of the margin of toxic safety of the compound; the higher the number, the less toxic the compound relative to the dosage needed to induce anesthesia, therefore the less chance there is of administering an overdose. The three most highly developed commercial fluorinated anesthetics ("Fluomar" (trifluoroisopropyl vinyl ether); "Fluothane" (1,1,1-trifluoro-2-bromo-2-chloroethane); "Penthrane" (2,2-dichloro-1,1-difluoroethyl ether)) have "$AD_{50}$" values of 3.5, 0.78 and 0.51 respectively, and "AI" values in the range of 3.3 to 4.5.

TABLE I.—INHALATION ANESTHETIC TESTS ON MICE

| Compound of Example | $AD_{50}$ | $LD_{50}$ | AI (LD/AD) |
| --- | --- | --- | --- |
| 2 | 0.71 | 3.237 | 4.5 |
| 3 | 0.277 | 1.501 | 5.4 |
| 4 | 0.345 | 5.55 | 16.07 |
| 5 | 0.749 | 3.873 | 5.17 |
| 6 | 0.955 | 3.41 | 3.57 |
| 7 | 0.36 | 1.65 | 4.56 |
| Fluothane | 0.78 | 2.74 | 3.5 |
| Penthrane | 0.51 | 2.28 | 4.5 |
| Fluomar | 3.5 | 11.6 | 3.3 |

It will be noted from Table I that the ethers of our invention are generally satisfactory with regard to the dosage required, $AD_{50}$, and generally superior to the commercially used fluorinated anesthetics with respect to their safety (AI).

While the above describes the preferred embodiments of our invention, it will be understood that departures can be made therefrom within the scope of the specification.

We claim:

1. Fluorinated methyl ethers of the formula

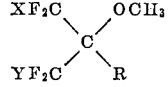

wherein X and Y are the same or different atoms selected from hydrogen, fluorine and chlorine; R is a member of the group consisting of ethyl, ethenyl and ethynyl radicals.

2. The compound of claim 1 wherein X and Y are fluorine and R is —C≡CH.

3. The compound of claim 1 wherein X is fluorine, Y is chlorine and R is —C≡CH.

4. The compound of claim 1 wherein X and Y are hydrogen and R is —C≡CH.

5. The compound of claim 1 wherein X and Y are fluorine and R is —CH=CH$_2$.

6. The compound of claim 1 wherein X and Y are fluorine and R is —CH$_2$—CH$_3$.

7. The compound of claim 1 wherein X is fluorine, Y is hydrogen and R is —C≡CH.

References Cited

UNITED STATES PATENTS

| | | |
|---|---|---|
| 2,522,566 | 9/1950 | Chaney. |
| 3,189,621 | 6/1965 | Harnik. |
| 3,346,448 | 10/1967 | Gilbert et al. |

LEON ZITVER, *Primary Examiner.*

HOWARD T. MARS, *Assistant Examiner.*

U.S. Cl. X.R.

260—999; 424—339